US008612200B2

(12) United States Patent
Wang et al.

(10) Patent No.: US 8,612,200 B2
(45) Date of Patent: Dec. 17, 2013

(54) PLC SYMBOL STRUCTURE FOR A PLC CODE FOR AUTOMATICALLY GENERATING AN INPUT/OUTPUT MODEL, AND SIMULATION APPARATUS AND SIMULATION METHOD FOR TESTING THE PLC CODE USING SAME

(75) Inventors: Gi Nam Wang, Suwon-Si (KR); Sang Chul Park, Yongin-Si (KR); Hyeong Tae Park, Suwon-Si (KR)

(73) Assignee: UDMTEK Co., Ltd., Gyeonggido (KR)

( * ) Notice: Subject to any disclaimer, the term of this patent is extended or adjusted under 35 U.S.C. 154(b) by 51 days.

(21) Appl. No.: 13/260,365

(22) PCT Filed: Mar. 24, 2010

(86) PCT No.: PCT/KR2010/001811
§ 371 (c)(1),
(2), (4) Date: Sep. 25, 2011

(87) PCT Pub. No.: WO2010/110597
PCT Pub. Date: Sep. 30, 2010

(65) Prior Publication Data
US 2012/0022849 A1    Jan. 26, 2012

(30) Foreign Application Priority Data

Mar. 25, 2009   (KR) .................. 10-2009-0025233

(51) Int. Cl.
*G06F 9/45* (2006.01)
*G06F 9/455* (2006.01)
*G06F 19/00* (2011.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl.
USPC .................. 703/22; 703/23; 700/95; 715/255

(58) Field of Classification Search
USPC .......................... 703/22, 23; 700/95; 715/255
See application file for complete search history.

(56) References Cited

U.S. PATENT DOCUMENTS

2009/0089700 A1*   4/2009   Gu et al. ....................... 715/771

FOREIGN PATENT DOCUMENTS

JP          2005-044316 A      2/2005
JP          2005044316 A       2/2005
(Continued)

OTHER PUBLICATIONS

Sang C. Park, Chang Mok Park, NPL, "PLCStudio: Simulation based PLC code verification", Dec. 7-10, 2008.*

(Continued)

*Primary Examiner* — Omar Fernandez Rivas
*Assistant Examiner* — Angel Calle
(74) *Attorney, Agent, or Firm* — The PL Law Group, PLLC

(57) ABSTRACT

Disclosed are a PLC (Programmable Logic Controller) symbol structure for a PLC code for automatically generating an input/output model, and a simulation apparatus and a simulation method for testing the PLC code using the same. In one embodiment, a computer-readable recording medium records a PLC code including a plurality of PLC symbols, wherein each of the PLC symbols includes a plurality of levels identified by an identifier, and a computer automatically generates an input/output model using the structure of each of the PLC symbols, thereby performing a simulation for testing the PLC code. The PLC symbol structure according to one embodiment systematically contains information required for automatically generating the input/output model, making it possible to automatically generate the input/output model for testing the PLC code in an easier manner without knowledge of simulation and modeling, and reducing the time consumed and the labor required for generating the input/output model.

12 Claims, 7 Drawing Sheets

(56) References Cited

FOREIGN PATENT DOCUMENTS

| JP | 2008-203947 A | 9/2008 |
|---|---|---|
| KR | 10-2000-0041640 A | 7/2000 |
| KR | 20000041640 A | 7/2000 |

OTHER PUBLICATIONS

Min. S Ko, NPL, "Visual Validation of PLC Programs", Jan. 5, 2008 (google).*

Park, Hyeong Tae et al., PLC symbol naming rule for auto generation of Plant Model in PLC simulation. Journal of the Korea society for simulation, 2008, vol. 17, No. 4, pp. 1-9. (See abstract and chapters 1 to 4.), Abstract.

Park, Hyeong Tae et al., 'Plant Model generation for PLC simulation.' Korea Institute of Industrial Engineers 2008 Fall Conference, Nov. 8, 2008. (See abstract and chapters 1 to 6.), No English translation.

Park, Hyeong Tae et al., 'DEVS-based PLC symbol naming rule for auto generation of Plant Model.' 2009 Conference on Society of CAD/CAM Engineers, Feb. 5, 2009. (See abstract and chapters 1 to 4.), Abstract.

Ver 9.xx PSpice basic and applications, Choipyoung, Bokdu press, pp. 93-98, Table 2-6, device provided by PSpice, Sep. 1, 1999.

International Search Report for PCT/KR2010/001811.

English Translation of Abstract of KR10-2000-0041640.

English Translation of Abstract of JP2005-044316.

Park, Hyeong Tae et al., PLC symbol naming rule for auto generation of Plant Model in PLC simulation. Journal of the Korea society for simulation, 2008, vol. 17, No. 4, pp. 1-9. (See abstract and chapters 1 to 4.).

Park, Hyeong Tae et al., 'DEVS-based PLC symbol naming rule for auto generation of Plant Model.' 2009 Conference on Society of CAD/CAM Engineers, Feb. 5, 2009. (See abstract and chapters 1 to 4.).

* cited by examiner

| LEVEL 1 | LEVEL 2 | LEVEL 3 | LEVEL 4 | LEVEL 5 | LEVEL 6 |

| LEVEL | DESCRIPTION | EXAMPLE |
|---|---|---|
| LEVEL1 | LINE IDENTIFIER | ASSEMBLE |
| LEVEL 2 | PROCESS IDENTIFIER | STN300 |
| LEVEL 3 | FACILITY IDENTIFIER | ROBOT |
| LEVEL 4 | INPUT/OUTPUT IDENTIFIER | I or O |
| LEVEL 5 | STATE IDENTIFIER | WELDING |
| LEVEL 6 | SENSOR IDENTIFIER | LS3(LIMIT SENSOR3) |

INPUT/OUTPUT MODEL

PRIOR ART

PRIOR ART

PLC SYMBOL STRUCTURE FOR A PLC CODE FOR AUTOMATICALLY GENERATING AN INPUT/OUTPUT MODEL, AND SIMULATION APPARATUS AND SIMULATION METHOD FOR TESTING THE PLC CODE USING SAME

CROSS-REFERENCE TO RELATED APPLICATION(S)

This application is a National Stage of International Application No. PCT/KR2010/001811, filed Mar. 24, 2010, which claims priority from Korean Patent Application No. 10-2009-0025233 filed on Mar. 25, 2009, the contents of all of which are incorporated herein by reference in their entirety.

BACKGROUND

1. Technical Field

The present invention relates to a programmable logic controller (PLC) symbol structure of a PLC code for automatically generating an input/output model, and a simulation apparatus and method for testing a PLC code using the PLC symbol structure, and more particularly, to a PLC symbol structure that systematically includes information required to automatically generate an input/output model, and a simulation apparatus and method for testing a PLC code using the PLC symbol structure.

2. Description of the Related Art

As industries have been rapidly developed and highly advanced, an automated manufacturing system has been evolving fast than ever. With the development of industries, a conventional automated manufacturing system needs to be changed into a new automated manufacturing system, and the delay in introducing a new automated system may cause a great loss of profit and credibility.

Various automated facilities which constitute an automated manufacturing system are controlled and operated by a programmable logic controller (PLC). The PLC stores therein ladder diagram information as a control program in the form of Boolean logic.

The automated facilities of the automated manufacturing system are operated in response to PLC output signals output from the PLC. The process state during operation or after operation may be monitored by a sensor and transmitted to the PLC in the form of a PLC input signal. The PLC input signal is a signal containing information on the updated process state.

The PLC re-performs an internal logic operation in response to the PLC input signal to output a PLC output signal. The PLC output signal is a signal that instructs the automated facilities to perform the next process according to the updated process state. The automated equipment performs processes, which accord with the updated process state, in response to the PLC output signal.

To run an automated manufacturing system in practice, a process control operator may write in person a control program for the automated manufacturing process by including PLC code, and make a test run of the control program by applying it to real facilities of the system. However, since the control program is apt to have inherent human error, the manufacturing control operator needs to test the automated manufacturing system prior to the test running with respect to ladder diagram that includes the PLC code.

For immediate introduction of an automated manufacturing system, it becomes general to test the automated manufacturing system, and control engineers thus have paid growing attention to the test of the control program for the automated manufacturing system. In addition, verifying the control program after satisfactory design of PLC is a prerequisite for introducing an automated control system.

In the course of testing a PLC code, a model to virtually execute functions of real automated facilities is required, and is referred to as a plant model. The plant model operates the virtual facilities in response to a received PLC output signal, and transmits, to the PLC, a virtual facility operating state and sensor values in the form of PLC input signals wherein the sensor values are updated according to a process state that is updated based on the result of operating the virtual facility operation.

A typical method of testing a PLC code is to test using the aforementioned virtual plant model. To construct such a plant model, a process control operator needs to thoroughly analyze a PLC code. In some cases, the process control operator may have to gain such a level of knowledge that is required for writing a PLC code.

Such analysis and achievement of the knowledge take a substantial amount of time and effort, and accuracy and integration of a plant model constructed accordingly cannot be completely assured. Thus, when an error is detected in the course of testing a PLC code, it may not be possible to identify whether the detected error is a plant model error or a PLC code error.

SUMMARY

The following description relates to a computer readable recording medium having embodiment thereon a programmable logic controller (PLC) symbol structure that includes systematically information required to automatically generate an input/output model.

The present invention is to provide a simulation apparatus for testing a PLC code using the PLC symbol structure.

The present invention is to provide a simulation method for testing a PLC code using the PLC symbol structure.

In one general aspect, there is provided a computer-readable recording medium which records a programmable logic controller (PLC) code including a plurality of PLC symbols, wherein a structure of each of a plurality of the PLC symbols includes a plurality of levels identified by an identifier and a computer automatically generates an input/output model using the structure of each of the PLC symbols and performs a simulation for testing the PLC code.

The identifier may be an under-bar '_'.

A plurality of the levels may include a line identifier, a process identifier, a facility identifier, an input/output identifier, and a state identifier.

A plurality of the levels may further include a sensor identifier.

In another general aspect, there is provided a simulation apparatus for testing a programmable logic controller (PLC) code that is input to and output from a PLC for operation of the PLC, the simulation apparatus including: a PLC code storing unit configured to store the PLC code including a plurality of PLC symbols, wherein a structure of each of a plurality of symbols includes a plurality of levels identified by an identifier; a model defining unit configured to define facilities that communicate with the PLC as input/output models; a symbol extracting unit configured to extract PLC symbols which are input and output between the PLC and the input/output models from the PLC code storing unit; a state defining unit configured to analyze the extracted PLC symbols to define possible states of the input/output models; and a state control unit configured to control the states by implementing a transition event for state transition, an entering event for entering a state, and a leaving event for leaving a current state with respect to each of the states in response to the extracted PLC symbols.

The identifier may be an under-bar '_'.

A plurality of the levels may include a line identifier, a process identifier, a facility identifier, an input/output identifier, and a state identifier.

When an input/output identifier of a corresponding PLC symbol is an input identifier, the state control unit may implement an entering event for entering a state corresponding to a state identifier of the PLC symbol or a leaving event for leaving a state corresponding to a state identifier of the PLC symbol, and when the input/output identifier is an output identifier, the state control unit may implement a transition event for transiting to a state corresponding to a state identifier of the PLC symbol.

A plurality of levels may further include a sensor identifier.

When an input/output identifier of PLC symbols having the same line identifier, process identifier, and state identifier is an input identifier, the state control unit may implement an entering event for entering a state corresponding to the state identifier of the PLC symbols or a leaving event for leaving a current state corresponding to the state identifier in response to a sensor identifier of the PLC symbols.

In another general aspect, there is provided a simulation method for testing a programmable logic controller (PLC) code which is input to and output from a PLC for operation of the PLC using a simulation apparatus which includes a PLC code storing unit configured to store the PLC code including a plurality of PLC symbols, each including a plurality of levels identified by an identifier, the simulation method including: defining facilities that communicate with the PLC as input/output models; extracting PLC symbols which are input and output between the PLC and the input/output models from the PLC code storing unit; analyzing the extracted PLC symbols to define possible states of the input/output models; and controlling the states by implementing a transition event for state transition, an entering event for entering a state or a leaving event for leaving a current state with respect to each of the states in response to the extracted PLC symbols.

The identifier may be an under-bar '_'.

A plurality of the levels may include a line identifier, a process identifier, a facility identifier, an input/output identifier, and a state identifier.

In this case, the controlling of the states may include implementing an entering event for entering a state corresponding to a state identifier of a PLC symbol when an input/output identifier of the PLC symbol is an input identifier and implementing a transition event for transiting to a state corresponding to a state identifier of a PLC symbol when the input/output identifier of the PLC symbol is an output identifier.

A plurality of the levels may further include a sensor identifier.

The controlling of the states may include, when an input/output identifier of PLC symbols having the same line identifier, process identifier, facility identifier and state identifier, implementing an entering event for entering a state corresponding to a state identifier of the PLC symbols or a leaving event for leaving a current state corresponding to a state identifier of the PLC symbols.

BRIEF DESCRIPTION OF THE DRAWINGS

Other features and aspects may be apparent from the following detailed description, the drawings, and the claims.

Figures 1, 2:
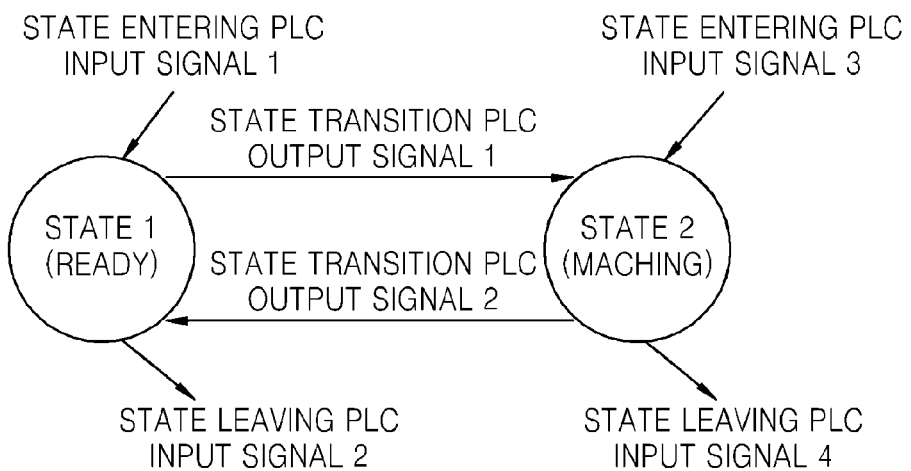
FIG. 1 is a diagram for explaining a structure of a PLC symbol according to an exemplary embodiment of the present invention.
FIG. 2 is a diagram of a facility state of an input/output model according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The present invention provides a new simulation method that automatically generates an input/output model for use in simulation for testing a programmable logic controller (PLC) code. The input/output model is one of plant models, which operates virtual facilities in response to a PLC output signal, detects the operation result by means of a virtual sensor, and transmits the detected result as a PLC input signal.

In prior art, after a PLC code has been comprehensively analyzed and studied, definition of facilities under the control of a PLC are made, and a state of each of the defined facilities is identified. After analyzing the PLC code, a PLC output signal for implementing a transition event that causes state transition of each facility is found and allocated to a relevant event, and a PLC input signal for implementing an entering event or a leaving event in which a state enters another state or leaves the current state is found to define a sensor signal that senses a state of each facility and then the PLC input signal is allocated to a relevant event.

In contrast, according to the present invention, a definition of a structure of each of a plurality of PLC symbols constituting a PLC code is made, and by use of the structure of each of the PLC symbols, simulation is performed by automatically generating an input/output model required for testing the PLC code. The PLC symbols are electric signals for communication between a PLC and automated facilities under the control of the PLC, and contain information required to structurally generate an input/output model. In the present invention, each of the PLC symbols has a structure which can systematically contain information using an identifier, for example, an under-bar '_'. A simulation apparatus for testing the PLC code automatically generates an input/output model using input PLC symbols.

Hereinafter, a structure of a PLC symbol will be described first, and a simulation apparatus and method for testing a PLC code using the PLC symbol then will be described.

Information required to automatically generate an input/output model may include a number of levels systematically. In the present invention, the information may include a plurality of levels, preferably five levels, more preferably six levels. In addition, in the present invention, the levels are identified by an identifier such as an under-bar '_'.

FIG. 1 is a diagram for explaining a structure of a PLC symbol according to an exemplary embodiment of the present invention. As shown in FIG. 1, the PLC symbol structure includes six levels, and levels are identified by an identifier, i.e. an under-bar '_'. By means of the identifier, the levels can be systematically organized into a structure.

In the case of a PLC symbol structure including six levels, the levels are identified by a line identifier, a process identifier, a facility identifier, an input/output identifier, a state identifier, and a sensor identifier. In another example, the PLC symbol structure may include five levels, which may be identified by a line identifier, a process identifier, a facility identifier, an input/output identifier, and a state identifier. Moreover, the levels may be preferably arranged in the order of a line identifier, a process identifier, a facility identifier, an input/output identifier, a state identifier, and a sensor identifier.

The line identifier of Level 1 has a symbol field that may specify an identifier for identifying a line, to which a facility related to the PLC symbol belongs, in an automated system. The process identifier of Level 2 has a symbol field that may specify an identifier for identifying a name of a process in the line to which an operating facility related to the PLC symbol belongs.

The facility identifier as Level 3 has a symbol field that may specify an identifier for identifying a name of a facility. Based on the line identifier of Level 1, the process identifier of Level 2 and the facility identifier of Level 3, a facility, a process that the facility is involved in, and a line that the process belongs to, which are related to the PLC symbol, may be identified in the automated system.

The input/output identifier of Level 4 has a symbol field that may specify an identifier for identifying a relevant signal is a PLC output signal to operate the facility or a PLC input signal to notify of a state of the process or the facility which is detected by a sensor. In the case of a PLC output signal, an output identifier (in the embodiment, referred to as 'O') is specified as the input/output identifier, and in the case of a PLC input signal, an input identifier (in the embodiment, referred to as 'I') is specified as the input/output identifier. That is, a PLC symbol having Level 4 specified as "O" is a PLC output signal, and a PLC symbol having Level 4 specified as "I" is a PLC input signal.

The state identifier of Level 5 has a symbol field that may specify an identifier for identifying a state of the facility. In this case, the state of the facility may identify an inherent operation of the facility or a change in operation of the facility.

For example, in the case where the input/output identifier of Level 4 is an output identifier that identifies a PLC output signal, the relevant PLC symbol may be a signal to control the facility to perform an operation specified by the state identifier. On the other hand, in the case where the input/output identifier is an input identifier that identifies a PLC input signal, the relevant PLC symbol may be a signal used to sense a state of the facility wherein the state is specified by the state identifier.

More specifically, state information of the facility, which is information contained in Level 5, is taken as reference to define a state of a specific facility model of a plant model including a set of facility models, and a transition between states of each facility may occur in response to a PLC output signal.

In practice, in a real automated manufacturing field, generally a signal for monitoring one process is sensed by one or more sensors and is transmitted to a PLC. Because the PLC issues an instruction for the subsequent process based on information about the completion or the progress of a current process which has been explicitly recognized, one or more sensors are used to identify a progress state more accurately.

However, if the PLC symbol structure includes only five levels, this indicates that there is only one signal sensed by a sensor. If only one sensor is used to sense a signal, it is impracticable to verify a PLC code for a process control in a real work environment. Hence, to sense a particular task, a plurality of sensors may be required to be installed.

When a plurality of sensors are installed, each of a plurality of the sensors to sense a task of the same facility is required to have an allocated identifier so as to transfer a sensing signal to a PLC. If only one sensing signal is transmitted to the PLC from among a plurality of sensors to sense one task, process logic in the PLC will not be able to issue an instruction for the subsequent process since not more than one input signal has been transmitted to the PLC.

In consideration of consequences that result from a PLC symbol including only five levels, the exemplary embodiment of the present invention further includes information of Level 6 in the PLC symbol. Such six-level PLC symbol structure contributes to realistic and substantial PLC code verification simulation.

The sensor identifier of Level 6 has a symbol field that may specify an identifier for identifying a sensor that senses a state of the facility. There may be provided a plurality of sensors to sense a state of a facility wherein each of the sensors may sense a state of the same facility but sensing results may be different among the sensors. Not all PLC symbols include Level 6, but only PLC symbols related to a facility which includes a plurality of sensors to sense a state of the facility includes Level 6. In addition, the symbol field of the sensor identifier may specify a name of a sensor.

The PLC output signal, as a signal used to operate a facility or change a state of a facility, may not include a sensor ID. On the other hand, the PLC input signal, as a signal used to sense a state of a facility, may include a sensor ID when a plurality of sensors are installed to sense a state of the facility.

Hereinafter, an apparatus and a method for generating an input/output model by use of information of levels contained in the PLC symbol and performing a simulation for testing a PLC code are described. FIG. 2 is a diagram of a facility state of an input/output model according to an exemplary embodiment of the present invention. The schematic description of generation of the input/output model and operation of performing a simulation of FIG. 2 are as described below.

A facility for use in a specific process in a specific line may be defined according to information of Level 1 to Level 3. As a result, symbols related to the facility may be extracted from among all symbols included in a PLC code. Then, according to information of Level 4, PLC input signals and PLC output signals may be distinguished therebetween among the extracted symbols. Thereafter, according to information of Level 5 of each of the distinguished PLC output signals, all possible states of the facility in the input/output model may be defined (for example, State 1 (READY) and State 2(MATCHING) in FIG. 2).

A transition between states may take place according to information of Level 5 of each of the PLC output signals (state transition PLC output signal 1 and state transition PLC output signal 2), and the state of the facility may be set to information of level 5 of each of the PLC input signals (state entering PLC input signal 1, state leaving PLC input signal 2, state entering PLC input signal 3, and state leaving PLC input signal 4). Moreover, if a plurality of sensors are provided to sense a state of the facility, a sensor that senses a PLC input signal as a state of the facility may be identified according to information of Level 6.

The detailed descriptions of a simulation apparatus and method will now be provided with reference to FIGS. 3 to 10.

Figure 3:
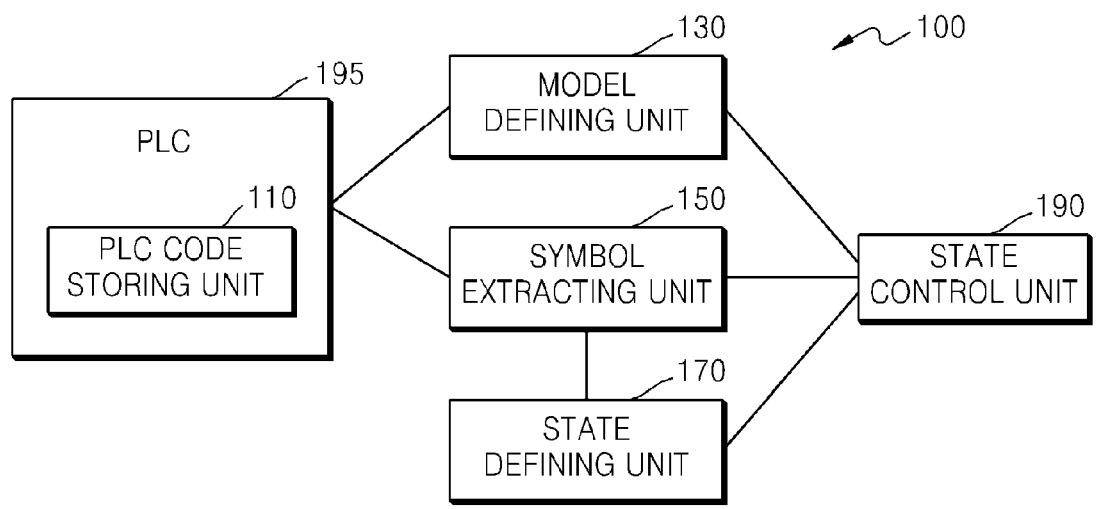
FIG. 3 is a block diagram illustrating a simulation apparatus according to an exemplary embodiment of the present invention.
Figure 4:
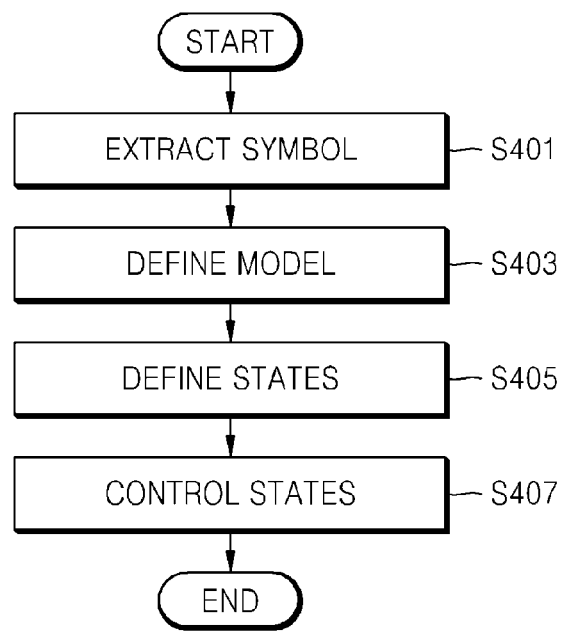
FIG. 4 is a flowchart illustrating a simulation method according to an exemplary embodiment of the present invention.

FIG. 3 is a block diagram illustrating a simulation apparatus according to an exemplary embodiment of the present invention. FIG. 4 is a flowchart illustrating a simulation method according to an exemplary embodiment of the present invention. The simulation apparatus 100 is to test a PLC code stored in a PLC 195 for operation of the PLC 195. The simulation apparatus 100 may include a PLC code storing unit 110, a model defining unit 130, a symbol extracting unit 150, a state defining unit 170, and a state control unit 190.

The PLC code storing unit 110 may store a PLC code that includes a plurality of PLC symbols. In the exemplary embodiment shown in FIG. 3, the PLC code storing unit 110 is configured to be included in the PLC 195, but the PLC code storing unit 110 may be separately provided as an external unit, or may be included in the simulation apparatus 100. In this case, the PLC 195 may receive a PLC code stored in the PLC code storing unit 110 and store it.

As described above, a structure of each of a plurality of the PLC symbols includes a plurality of levels which are identified by an identifier (for example, an under-bar '_'). The structure of the PLC symbol is described in detail above, and thus a description thereof will not be reiterated.

The model defining unit 130 may define facilities that communicate with the PLC as input/output models (S403). The model defining unit 130 may define an input/output model by use of information from the PLC symbols that are extracted and stored by the symbol extracting unit 150 which will be described later. In the PLC that communicates with various facilities in an automated system and controls the facilities, the model defining unit 130 may communicate with the PLC and physically or logically divide the facilities which are under the control of the PLC to define input/output models.

As described above, according to information from Level 1 to Level 3 of the PLC symbol, a facility used for a specific process in a specific line may be defined. The model defining unit 130 may schematically define the input/output models using information contained in Level 1, Level 2 and Level 3.

Since Level 1 includes a line identifier, Level 2 includes a process identifier, and Level 3 includes a facility identifier, the model defining unit 130 may define an input/output model corresponding to a line using information of Level 1, define a process input/output model that constitutes the line input/output model by use of information of Level 1 and Level 2, and define a facility input/output model that constitutes the process input/output model of the line input/output model by use of the information of Level 1, Level 2 and Level 3. Thus, in the exemplary embodiment, facility input/output models may constitute a process input/output model, and the process input/output models may constitute a line input/output model. Furthermore, the model defining unit 130 may hierarchically structurize the line input/output model, the process input/output model, and the facility input/output model, which are defined by use of the information of Level 1, Level 2 and Level 3 of the extracted PLC symbol, or may organize these models into a tree structure.

In the above description, the model defining unit 130 is configured to define the input/output models using the PLC symbols extracted by the symbol extracting unit 150, whereas in another embodiment, the model defining unit 130 may directly search the PLC code storing unit 100 to obtain information of PLC symbols, and define input/output models using the obtained information.

Figure 5:
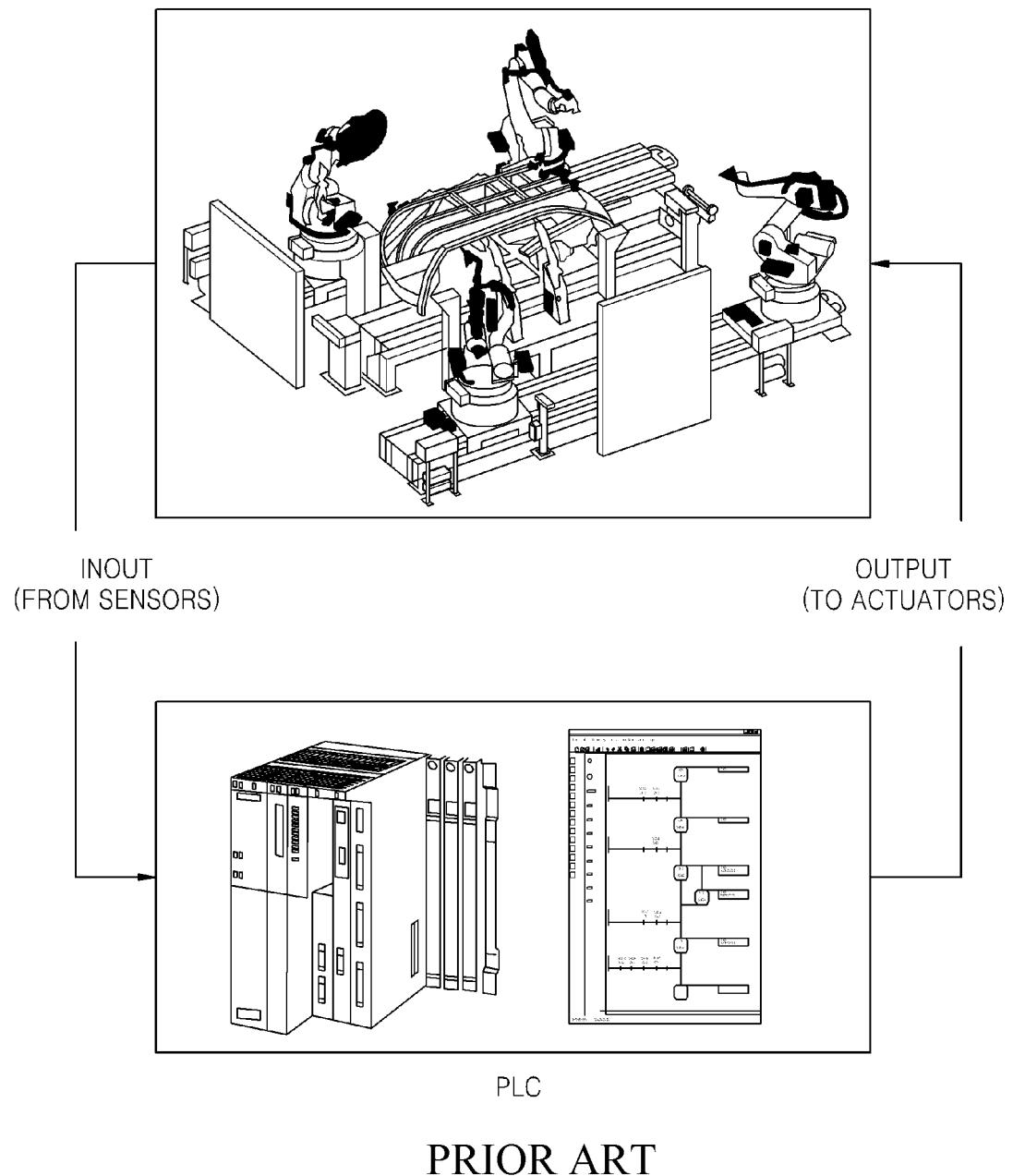
FIG. 5 is an illustration for explaining an input/output model defined by a model defining unit shown in FIG. 3.

FIG. 5 is an illustration for explaining an input/output model defined by the model defining unit shown in FIG. 3. Referring to FIG. 5, a facility and sensors in an automated system, which is to be defined as an input/output model, transmit and receive input and output signals while communicating with a PLC. The model defining unit may define the whole or part of facility sensors communicating with the PLC as input/output models. Thus, the input/output models may be defined for a process, a line in which the process is performed, and a process system that the line belongs to.

The symbol extracting unit 150 may search the PLC code storing unit 110 to extract PLC symbols which are input and output between the PLC 195 and the input/output model (S401), and store the extracted PLC symbols therein. In the exemplary embodiment, the symbol extracting unit 150 may extract all PLC symbols stored in the PLC code storing unit 110, and the model defining unit 130 may define the input/output model by use of information of Level 1 to Level 3 of each of the extracted PLC symbols.

Operation of defining an input/output model by the model defining unit 130 is described above, and thus a description thereof will not be reiterated.

The state defining unit 170 may analyze the extracted PLC symbols and define possible states of an input/output model (S405). In the exemplary embodiment, Level 5 of each PLC symbol specifies a state identifier. Thus, the state defining unit 170 may define possible states of the input/output model defined by analyzing information of Level 4 of each of the extracted PLC symbols.

The state control unit 190 may control the states by implementing a transition event for transition between states, and an entering event and a leaving event of each state in response to the extracted PLC symbols (S407). Hereinafter, operation of the state control unit 190 will be described in detail with reference to FIG. 6.

Figure 6:
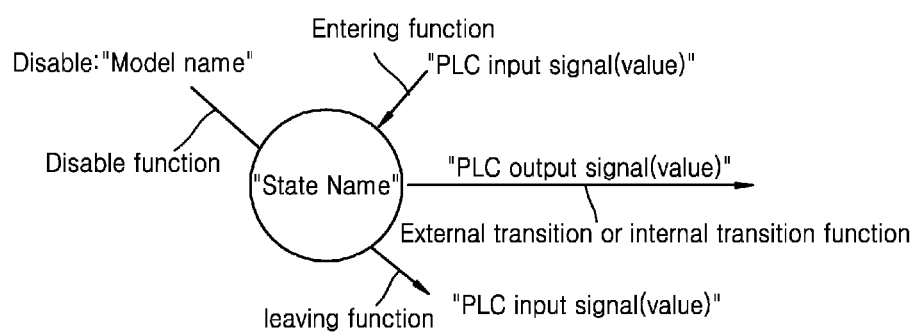
FIG. 6 is a diagram for explaining a state that constitutes an input/output model according to an exemplary embodiment of the present invention.

FIG. 6 is a diagram for explaining a state that constitutes an input/output model according to an exemplary embodiment of the present invention. As described above, the state control unit 190 may control a state in response to information from Level 4 and Level 5 of the PLC symbol, that is, an input/output identifier and a state identifier. As shown in FIG. 6, an event implemented for one state may be one of an entering event (or entering function), a leaving event, an external transition or internal transition event, and a disable event.

The disable event is to disable a facility (that is, a facility input/output model) corresponding to the state, and disables a facility model when the facility model enters the relevant state. In FIG. 6, as an example of implementing the disable event, a function, such as 'Disable: "Model name"', may be used to indicate that a facility of the relevant name is disabled.

Since the state control unit 190 implements the disable event upon satisfying requirements, hereinafter, operations of the state control unit 190 implementing an entering event, a leaving event, and a transition event will be described.

The state control unit 190 may control a state in a differentiated manner depending on information of Level 4 of the PLC symbol. If the information of Level 4 is an output identifier (that is, the PLC symbol is a PLC output signal (or value)), the state control unit 190 may implement a transition event for a state transition to a state corresponding to the state identifier. The control of the state control unit 190 may be to transit a state of the facility model (external transition) in response to an external input received from the PLC, or to transit the state of the facility model (internal transition) without receiving an external input from the PLC.

If the information of Level 4 is an input identifier (that is, the PLC symbol is a PLC input signal (or value)), the state control unit 190 may implement an entering event to enter a state corresponding to the state identifier, or a leaving event to leave a state corresponding to the state identifier. The control of the state control unit 190 is to transmit an entering message (an entering event) to the PLC if the facility model enters any state, or to transmit a leaving message (a leaving event) to the PLC if the facility model leaves a current state.

In a case where a plurality of sensors are installed to sense a state of the facility, a sensor identifier is specified as information of Level 6 according to the exemplary embodiment, contributing to identification of a sensor that generates a sensing signal. In this case, the state control unit 190 may implement an entering event to enter a state corresponding to the state identifier or a leaving event to leave a state corresponding to the state identifier in response to the sensor identifier of a corresponding PLC symbol.

Operations of generating a facility input/output model and simulating a PLC code of a corresponding facility by defining states of the facility input/output model defined by the model defining unit 130 and controlling the states by use of information of Level 4 and Level 5 or information of Level 4 to Level 6 are described hereinabove.

In the exemplary embodiment, by using a PLC symbol, a line input/output model, a process input/output model, and a facility input/output model may be defined. Since a number of facility input/output models can constitute a process input/output model and a number of process input/output models can form a line input/output model, a process input/output model and a line input/output model can be generated by combining discrete input/output models generated for each facility, and hence a PLC code simulation for the whole line and process can be performed.

Hereinafter, an exemplary embodiment applicable to a system including a handling robot, a workbench, and a welding robot will be described with reference to FIGS. 7 to 10.

Figure 7:
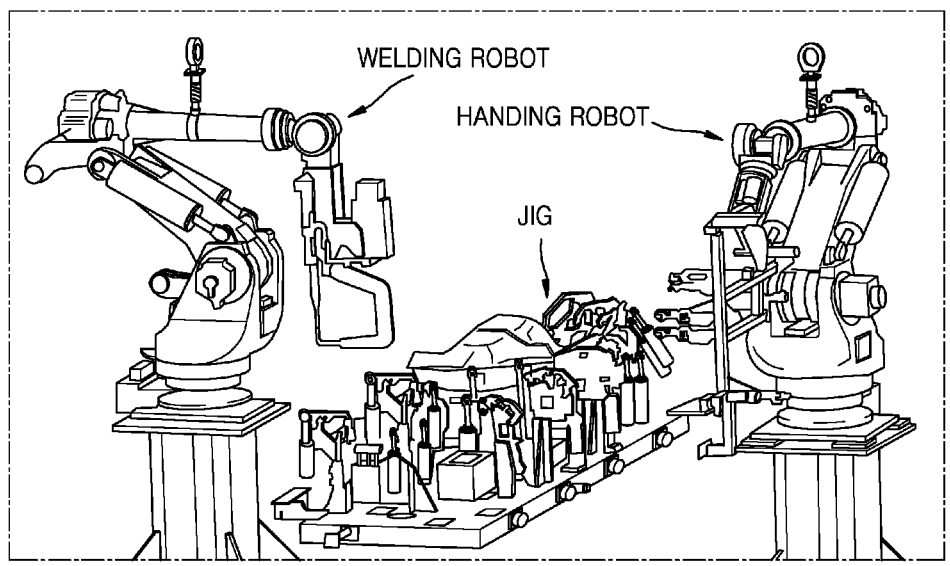
FIG. 7 is an illustration of an example of a system according to the exemplary embodiment of the present invention.

FIG. 7 is an illustration of an example of a system according to the exemplary embodiment of the present invention. The system shown in FIG. 7 includes a handling robot, a jig, and a welding robot as facilities.

A process performed by the system of FIG. 7 is for welding components, and includes a procedure of the handling robot placing a component to be welded on the workbench, a procedure of fixing the component by changing the jig from unclamp state to clamp state, a procedure of the welding robot welding on the fixed component, a procedure of changing the jig from clamp state to unclamp state upon completing the welding, and a procedure of the handling robot displacing the component.

Hereinafter, it is assumed that the process of FIG. 7 is WELD process in BODY line and has "BODY" as a line identifier and "WELD" as a process identifier. In addition, the handling robot, the jig, and the welding robot which perform the process have "HANDLROBOT," "JIG," and "WELDROBOT" as facility identifiers, respectively.

The model defining unit 130 may define input/output models in such a manner that a process model can hierarchically include a BODY line input/output model, a WELD process input/output model, and a HANDLROBOT facility input/output model, a JIG facility input/output model, and a WELDROBOT facility input/output model.

Figure 8:
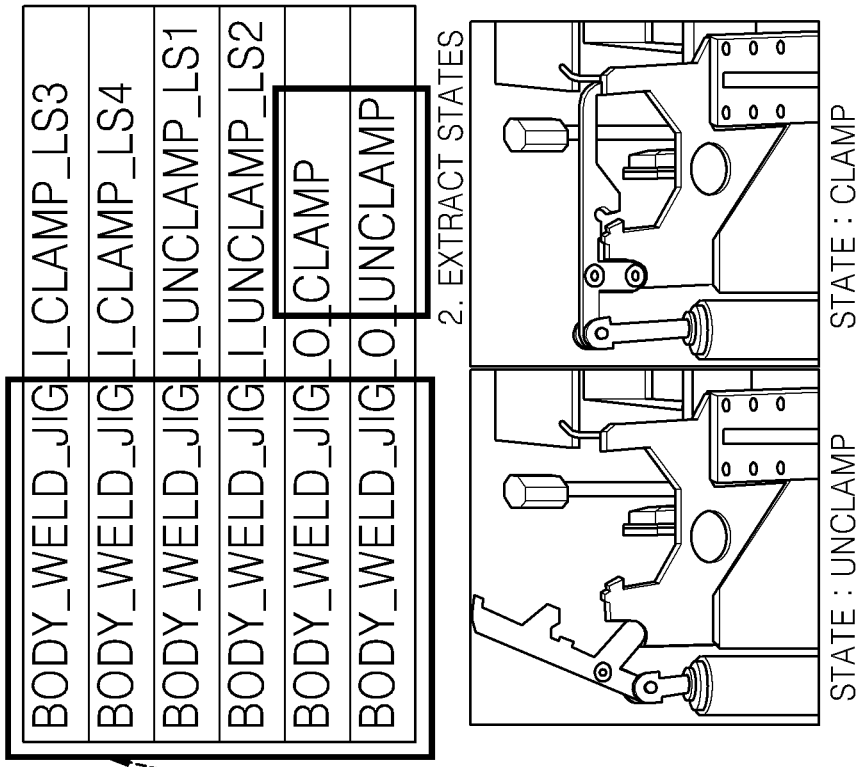
FIG. 8 is a list of PLC symbols used in the process of FIG. 7.

FIG. 8 is a list of PLC symbols used in the process of FIG. 7. The PLC symbols shown in FIG. 8 are extracted by the symbol extracting unit 150 from the PLC code storing unit 110. Operation of simulating a PLC code by generating a facility input/output model with respect to the jig using the extracted symbols will now be described. The input/output models of the process shown in FIG. 7 are made in the same way as a method described below, for example, by generating input/output models with respect to the other facilities, that is, the handling robot and the welding robot, and combining the generated input/output models, and thereby a PLC code simulation for the process shown in FIG. 7 may be performed.

The state extracting unit 170 may extract all possible states of the "JIG" facility by use of information of Level 5 of signals that have 'O' as information of Level 4 among symbols related to the JIG facility, that is, PLC output signals. In the exemplary embodiments of FIGS. 7 and 8, the "JIG" facility has two states, "CLAMP" and "UNCLAMP" (referring to reference numeral 2 of FIG. 8).

The state control unit 190 may control a change in states of the facility according to information of Level 5 of the PLC output signal. In other words, the state control unit 190 may allocate the PLC output signal as an external transition function signal according to information of Level 5 of the PLC output signal and implement a transition event. In FIG. 8, "BODY_WELD_JIG_O_CLAMP" signal is a PLC output signal for the "JIG" facility, and an external transition function signal to transit a state of the "JIG" facility to "CLAMP" state. The state control unit 190 implements a transition event to transit the state of the "JIG" facility to "CLAMP" state in response to the "BODY_WELD_JIG_CLAMP" signal.

On the other hand, in FIG. 8, "BODY_WELD_JIG_O_UNCLAMP" signal is a PLC output signal for the "JIG" facility, and an external transition function signal to transit a state of the "JIG" facility to "UNCLAMP" state. The state control unit 190 implements a transition event to transit a state of the "JIG" facility to "UNCLAMP" state in response to the "BODY_WELD_JIG_O_UNCLAMP" signal.

The state control unit 190 may have two sensors to sense "UNCLAMP" state of the "JIG" facility wherein the sensors have sensor identifier, "LS1," and "LS2," respectively. With respect to the PLC symbols of FIG. 8, the state control unit 190 assigns a value of '1' to a PLC input signal ('BODY_WELD_JIG_I_UNCLAMP_LS1(1),' BODY_WELD_JIG_I_UNCLAMP_LS2(1)') when a state of the "JIG" facility is transited to "UNCLAMP" state, and assigns a value of '0' to the PLC input signal (BODY_WELD_JIG_I_UNCLAMP_LS1(0)', 'BODY_WELD_JIG_I_UNCLAMP_LS2(0)') when the "JIG" facility leaves "UNCLAMP" state. With respect to "CLAMP" state, the state control unit 190 assigns a value in the same manner as for "UNCLAMP" state.

Figure 9:
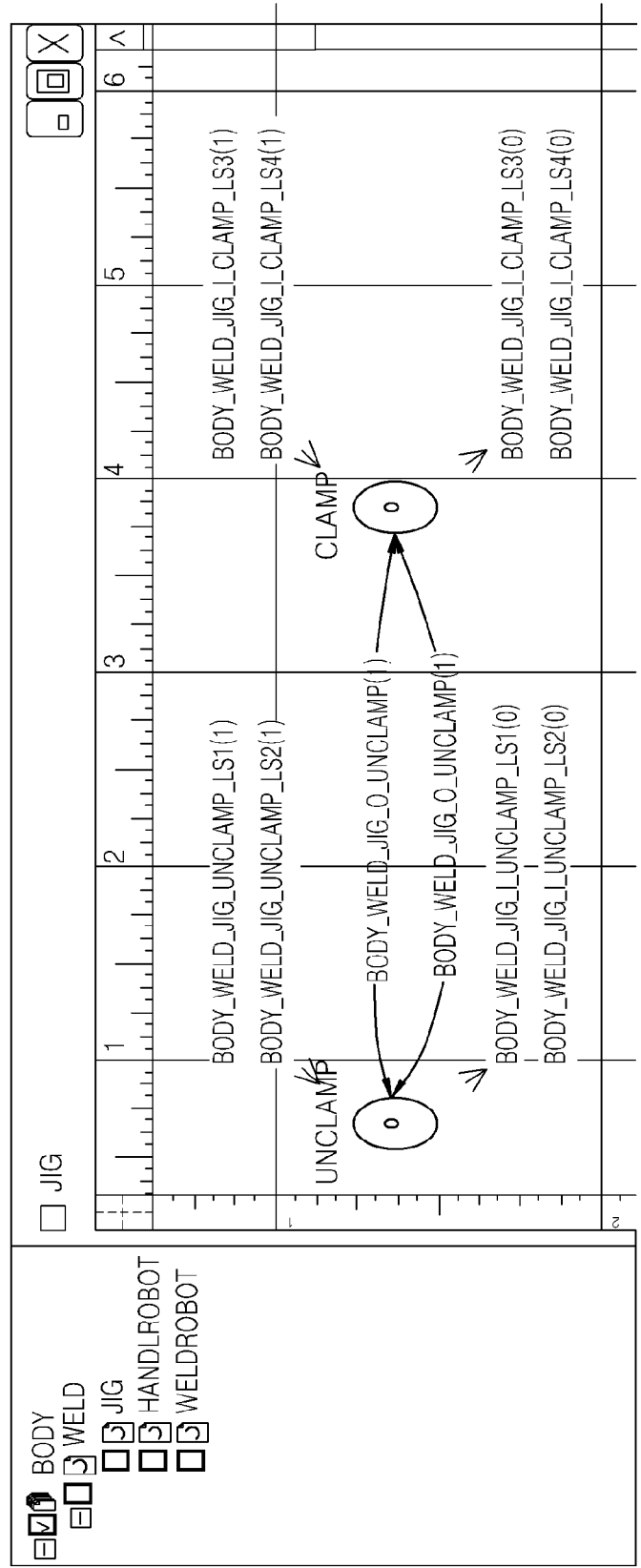
FIG. 9 is a state diagram of an input/output model for a jig of the system shown in FIG. 7.

FIG. 9 is a state diagram of an input/output model for the jig of the system shown in FIG. 7. The input/output model of FIG. 9 is generated under the control of the state control unit 190 which has described with reference to FIGS. 7 and 8. As shown in FIG. 9, the input/output model for the jig includes two states, "CLAMP" and "UNCLAMP," and events are implemented according to a PLC input signal and a PLC output signal which are determined based on information of Level 5.

Figure 10:
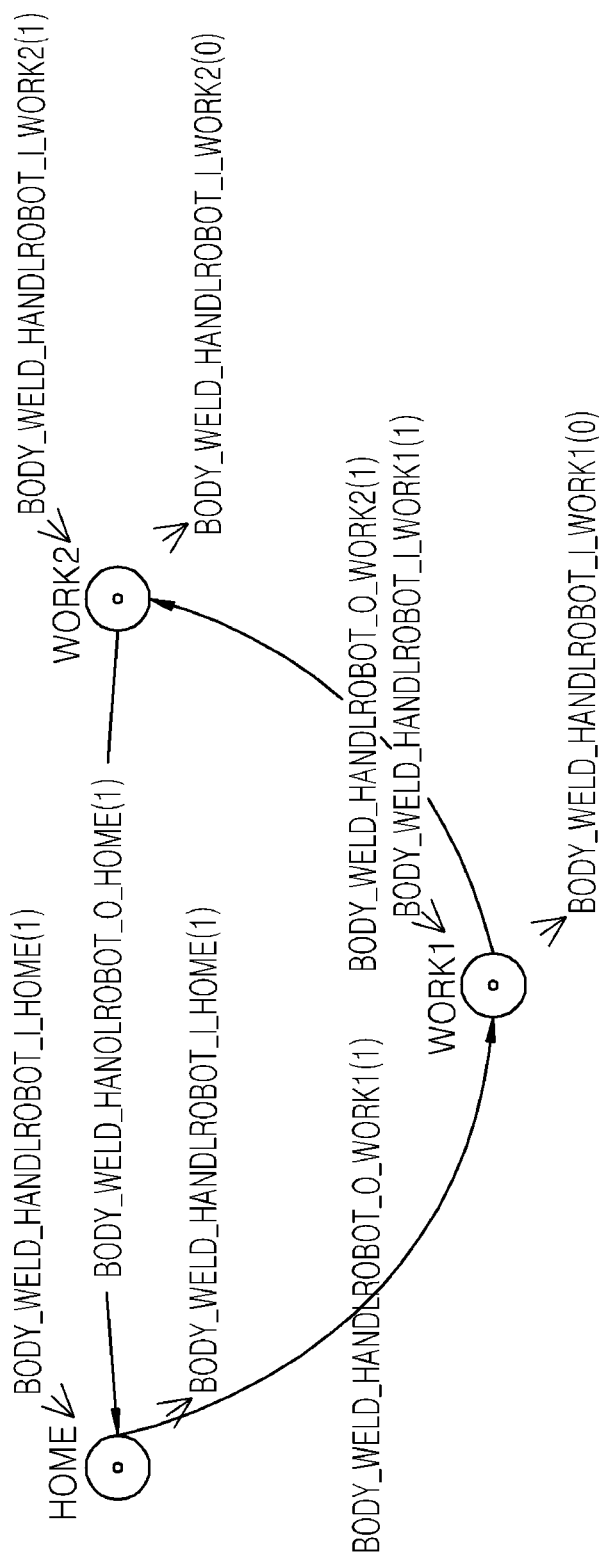
FIG. 10 is a state diagram of an input/output model for a handling robot of the system shown in FIG. 7.

FIG. 10 is a state diagram of an input/output model for the handling robot of the system shown in FIG. 7. The state control unit 190 may generate an input/output model for the handling robot in the same manner to generate the input/output model for the jig by use of extracted PLC symbols. Referring to FIG. 10, the input/output model for the handling robot has three states, "HOME," "WORK1," and "WORK2," and events are implemented according to a PLC input signal and a PLC output signal, which are determined based on information of Level 5.

In the present invention, to provide convenience to vendors, a function to export all PLC symbols included in a PLC code as a list file may be offered to the vendors. That is, the PLC symbols written according to the exemplary embodiments of the present invention may be provided to the vendors in the form of a list file. In this case, even when the individual vendors use different PLC software, the vendors may enable a simulation apparatus for use in testing a PLC code to generate an input/output model for simulation by receiving the list file of the PLC symbols.

Since a PLC symbol structure according to the exemplary embodiments of the present invention systematically includes information required for automatically generating an input/output model, it is possible to automatically generate an input/output model for testing a PLC code in an easier manner without knowledge on simulation and modeling, and it is advantageous to reduce time consumed and labor required to generate the input/output model.

In addition, the PLC symbol structure according to the exemplary embodiments prevents an input/output model error which may be incurred during an operator manually generates an input/output model, thereby allowing a more accurate test for a PLC code.

Furthermore, since the PLC symbol structure according to the exemplary embodiments of the present invention provides a function to export all PLC symbols used for a PLC code as a list file, demand from various vendors that use different PLC software may be satisfied.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A simulation apparatus for testing a programmable logic controller (PLC) code that is input to and output from a PLC for operation of the PLC, the simulation apparatus comprising:
   a PLC code storing unit configured to store the PLC code comprising a plurality of PLC symbols, wherein each of the plurality of PLC symbols comprises a plurality of levels for generating an input/output model, wherein the plurality of levels are identified by an identifier;
   a model defining unit configured to define facilities that communicate with the PLC as input/output models using the plurality of PLC symbols;
   a symbol extracting unit configured to extract PLC symbols which are input and output between the PLC and the input/output models from the PLC code storing unit;
   a state defining unit configured to analyze the extracted PLC symbols to define operation states of the defined facilities for the input/output models; and
   a state control unit configured to control the conversion of the operation states by implementing a transition event for operation state transition, an entering event for entering an operation state, and a leaving event for leaving a current operation state with respect to each of the operation states in response to the extracted PLC symbols.

2. The simulation apparatus of claim 1, wherein the identifier is an under-bar '_'.

3. The simulation apparatus of claim 1, wherein the plurality of the levels include a line identifier, a process identifier, a facility identifier, an input or output identifier, and a state identifier.

4. The simulation apparatus of claim 3, wherein when an input or output identifier of a corresponding PLC symbol is an input identifier, the state control unit implements an entering event or a leaving event for converting the operation states of the defined facilities for the input/output models to a state corresponding to a state identifier of the PLC symbol, and when the input/output identifier is an output identifier, the state control unit implements a transition event for converting the operation states of the defined facilities for the input/output models to a state corresponding to a state identifier of the PLC symbol.

5. The simulation apparatus of claim 3, wherein the plurality of levels further include a sensor identifier.

6. The simulation apparatus of claim 5, wherein when an input or output identifier of PLC symbols having the same line identifier, process identifier, and state identifier is an input identifier, the state control unit implements an entering event or a leaving event for converting the operation states of the defined facilities for the input/output models to a state corresponding to the state identifier of the PLC symbols in response to a sensor identifier of the PLC symbols.

7. A simulation method for testing a programmable logic controller (PLC) code which is input to and output from a PLC for operation of the PLC using a simulation apparatus which comprises a PLC code storing unit configured to store the PLC code comprising a plurality of PLC symbols, each comprising a plurality of levels for generating an input/output model, wherein the plurality of levels are identified by an identifier, the simulation method comprising:

- defining facilities that communicate with the PLC as input/output models using the plurality of PLC symbols;
- extracting PLC symbols which are input and output between the PLC and the input/output models from the PLC code storing unit;
- analyzing the extracted PLC symbols to define operation states of the defined facilities for the input/output models; and
- controlling the conversion of the operation states by implementing a transition event for operation state transition, an entering event for entering an operation state or a leaving event for leaving a current operation state with respect to each of the operation states in response to the extracted PLC symbols.

8. The simulation method of claim 7, wherein the identifier is an under-bar '_'.

9. The simulation method of claim 7, wherein the plurality of the levels include a line identifier, a process identifier, a facility identifier, an input or output identifier, and a state identifier.

10. The simulation method of claim 9, the controlling of the states comprises implementing an entering event or a leaving event for converting the operation states of the defined facilities for the input/output models to a state corresponding to a state identifier of a PLC symbol when an input/output identifier of the PLC symbol is an input identifier and implementing a transition event for converting the operation states of the defined facilities for the input/output models to a state corresponding to a state identifier of a PLC symbol when the input/output identifier of the PLC symbol is an output identifier.

11. The simulation method of claim 9, wherein the plurality of the levels further include a sensor identifier.

12. The simulation method of claim 11, wherein the controlling of the states comprises, when an input or output identifier of PLC symbols having the same line identifier, process identifier, facility identifier and state identifier, implementing an entering event or a leaving event for converting the operation states of the defined facilities for the input/output models to a state corresponding to a state identifier of the PLC symbols in response to a sensor identifier of the PLC symbols.

* * * * *